(12) United States Patent
Clark

(10) Patent No.: US 6,959,030 B1
(45) Date of Patent: Oct. 25, 2005

(54) METHOD AND APPARATUS FOR GENERATING AN INTERLEAVED CODE

(75) Inventor: James M. Clark, Verona, NJ (US)

(73) Assignee: ITT Manufacturinger Enterprises, Inc., Wilmington, DE (US)

(*) Notice: Subject to any disclaimer, the term of this patent is extended or adjusted under 35 U.S.C. 154(b) by 921 days.

(21) Appl. No.: 09/711,177

(22) Filed: Nov. 13, 2000

Related U.S. Application Data

(60) Provisional application No. 60/164,944, filed on Nov. 12, 1999, provisional application No. 60/164,945, filed on Nov. 12, 1999.

(51) Int. Cl.$^7$ ............................................. H04B 1/707
(52) U.S. Cl. ...................... 375/130; 375/242; 375/367; 370/208; 714/701
(58) Field of Search ............................. 375/130, 242, 375/367; 370/208; 379/361; 704/206; 708/314; 356/5.11; 341/157; 714/701

(56) References Cited

U.S. PATENT DOCUMENTS

| | | | | |
|---|---|---|---|---|
| 4,234,930 A | * | 11/1980 | Campbell | 708/314 |
| 4,529,963 A | * | 7/1985 | Gutleber | 341/81 |
| 4,534,055 A | * | 8/1985 | Iinuma | 704/206 |
| 4,537,502 A | * | 8/1985 | Miller et al. | 356/5.11 |
| 4,549,303 A | * | 10/1985 | Gutleber | 375/242 |
| 4,727,570 A | * | 2/1988 | Tarbouriech | 379/361 |
| 5,189,420 A | * | 2/1993 | Eddy et al. | 341/157 |
| 5,757,767 A | * | 5/1998 | Zehavi | 370/208 |
| 6,226,315 B1 | | 5/2001 | Sriram et al. | |
| 6,370,134 B1 | | 4/2002 | Aramaki | |
| RE38,523 E | * | 6/2004 | Ozluturk | 375/367 |

OTHER PUBLICATIONS

Spilker, Jr., J.J. "GPS Signal Structure and Performance Characteristics", pp. 29-54, Global Positioning System, The Institute of Navigation, vol. 1, 1980.
Glazer, B.G., "GPS Receiver Operation", pp. 81-86, Global Positioning System, The Institute of Navigation, vol. 1, 1980.
Winch, Robert G., Telecommunication Transmission System (Second Edition), Copyright 1998, 1993 by McGraw-Hill, pp. 128-135.
Ananda, M.P., et al., Satellite Naviagtion Systems, Autonomous Navigation of the Global Positioning Systems Satellites, McGraw-Hill Encyclopedia of Science and Technology, pp. 53-59, 1986.
Ananada, M.P. et al., Autonomous Navigation of the Global Positioning System Satellites, The AIAA Guidance and Control Conference, Aug. 20-22, 1984, pp. 1-11.

* cited by examiner

*Primary Examiner*—Shuwang Liu
*Assistant Examiner*—Eva Zheng
(74) *Attorney, Agent, or Firm*—Edell, Shapiro & Finnan, LLC

(57) ABSTRACT

An interleaved coding method can be used in a transmitter, in which the two or more pseudonoise (PN) codes are interleaved to form a longer interleaved code. The method can be used in a transmitter that includes a first code generator generating a first code of n symbols, and a second code generator generating a second code of m symbols, where n and m can be mutually prime, such as m=n+1. An interleave unit is coupled to the first and second code generators, and interleaves the symbols of the first code with the symbols of the second code to output an interleaved code. The interleaved code has a period longer than either of the constituent PN codes, providing for much increased noise tolerance over using the short codes alone, and can be detected at a much lower hardware and time cost than if using a single PN code of equal length.

14 Claims, 6 Drawing Sheets

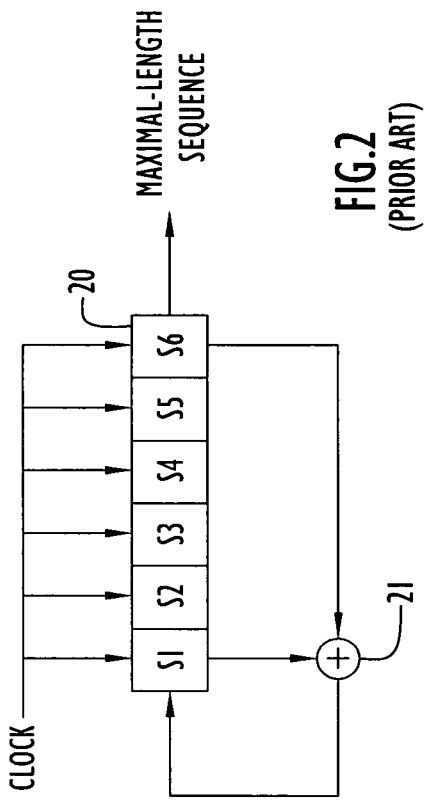

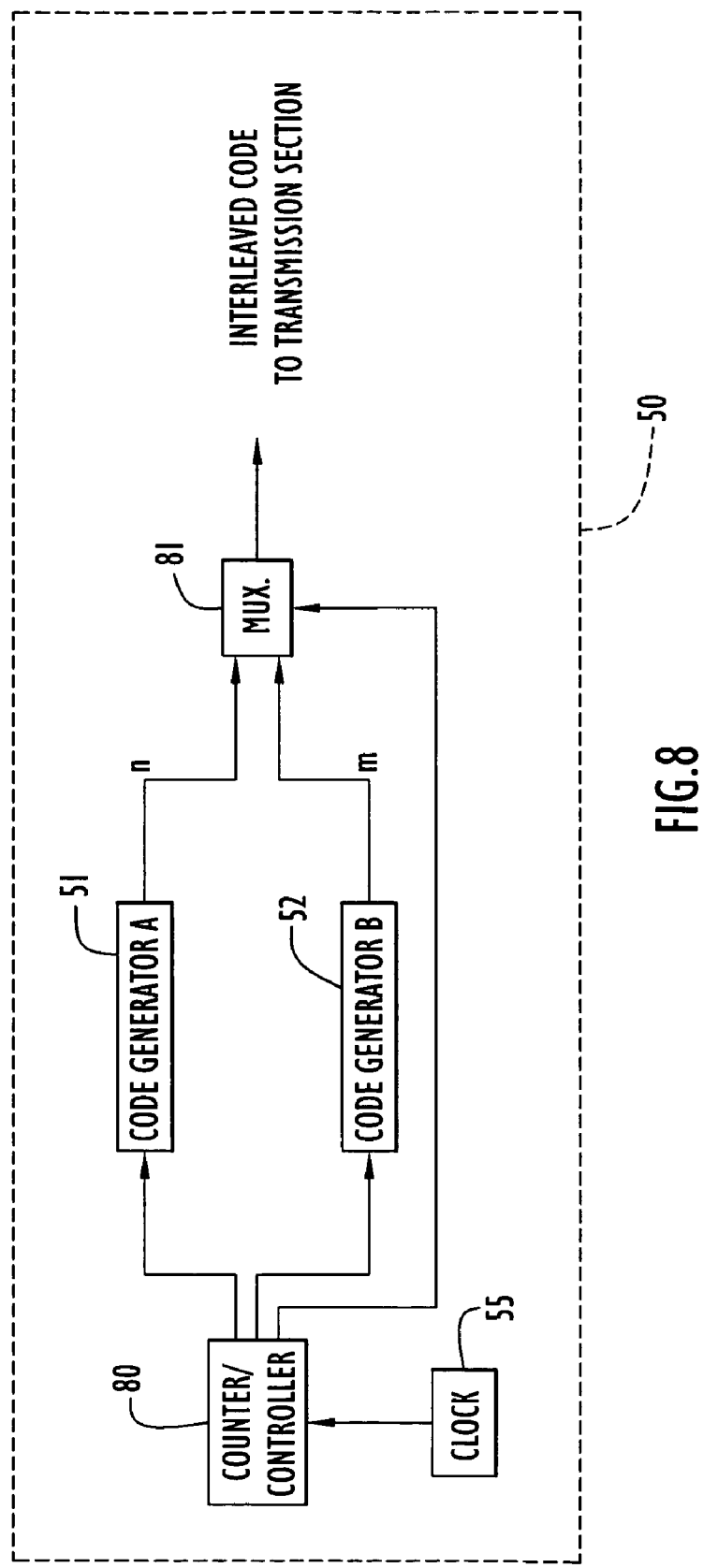

METHOD AND APPARATUS FOR GENERATING AN INTERLEAVED CODE

CROSS REFERENCE TO RELATED APPLICATION

This application claims priority from U.S. Provisional Patent Application Ser. No. 60/164,944, entitled "Interleaved Code Structure," and Ser. No. 60/164,945, entitled "Interleaved Code Detection" both filed Nov. 12, 1999. The disclosure of those provisional patent applications are incorporated herein by reference in their entirety.

BACKGROUND OF THE INVENTION

1. Field of the Invention

The present invention relates to digital data transmission systems and, more particularly, to coding structures and techniques for use in digital data transmission systems.

2. Description of the Related Art

When a transmitter sends a signal pattern that, by prearrangement, a receiver expects, this has the potential both to transmit timing information and provide for range measurement, namely determining the distance between the transmitter and the receiver. But the receiver's measurement of the time of arrival of the expected pattern depends both on the range and on the difference between the transmitter's and the receiver's timing, or internal clocks. Thus, the measurement is called a pseudorange. If the range were known, the time difference could be determined; or if the time error were negligible, the range could be determined. But usually there are both range and time uncertainties. In some applications, such as in the Global Positioning System (GPS) described in more detail below, multiple transmitters permit multiple pseudorange measurements; and, according to linear mathematics, when there are more knowns (e.g., measurements) than unknowns (e.g., uncertainties), the unknowns can be calculated.

In other applications, the expected pattern is simply a preamble to a message, and detecting the preamble pattern indicates the precise timing of the start of the message. In these applications, the timing and range uncertainties are not a problem because they apply equally to the preamble and to the message. Start-of-message timing, or detecting the start of a message, is especially important when the message is encrypted, because the message will not be recovered correctly if the decryption process is started at the wrong time.

In any case, a single pulse or simple signal feature does not convey timing reliably, because noise can easily obscure such a signal. Repeating a simple pattern (such as 010101 . . . ) is more reliable, but is ambiguous because the first "01" is indistinguishable from the second and third "01", for example. Thus, the pattern generally needs to be complex.

A pseudorandom code (also called a pseudonoise, or PN code), such as a maximum-length binary code (m-sequence), is often used to transmit timing information, because such codes are ideal for reliably detecting the time of arrival of a signal in the presence of noise. The code can be sent repeatedly, in which case the timing is analogous to the ticking of a clock with each repetition of the code corresponding to a clock tick. This code can be combined with other data that effectively identifies each 'tick' as distinct from the others, thus providing more complete time information such as the precise time of day. When noise is present, making the detection of the signal unreliable, repeating the code provides multiple opportunities to detect the timing.

An example of a system that uses PN codes is the Global Positioning System (GPS). The GPS system is a satellite based navigation system in which a receiver receives signals from a constellation of satellites and determines its position in three dimensions and determines the time. A GPS receiver determines its position and the time based on ranging measurements to several satellites. The ranging measurements are made based on the propagation delay of signals transmitted by the satellite and received by the receiver. The precision of those ranging measurements depends on the receiver's ability to synchronize its clock with the satellites' clocks. Accordingly, transferring timing information is an important feature in the GPS system.

In order to accurately make the ranging measurement and transfer timing information the GPS satellites transmit two signals using at least two PN codes, the so-called coarse acquisition (C/A) and precision (P) codes. The C/A code is 1023 bits long and repeats every millisecond with a chip rate of 1.023 MHz. The P code is much longer and repeats once per week, and is broadcast at a chip rate of 10.23 MHz, and therefore provides higher precision. Using the longer P code to make pseudorange measurements avoids ambiguities in time differences between the satellite's clock and the receiver's clock. Also, as discussed in more detail below, the longer code provides better noise tolerance than a short code.

Because the C/A code is short and repeats often, it is relatively easy to detect and acquire. However, because the P code is so long it is very difficult if not impossible to acquire it without at least some measure of timing information about the phase of the P code. Superimposed on the C/A code is a navigational message that provides a longer cycle of timing and related information. Once a receiver acquires the C/A code it can extract timing information from the C/A code for use in acquiring the longer P code. Accordingly, two separate signals, carrying different length codes are used in time transfer applications such as in the GPS system.

The use of a short code to help acquire a longer code can be illustrated with the GPS system. In acquiring a coded signal a receiver must search for a specific portion of the code to detect its phase. To start its search a receiver must "guess" at certain search parameters. For example, in the case of the C/A code, there are 1023 possible starting positions for the code; and only one guess out of 1023 is correct. Usually, this is doubled. A receiver is designed to guess at half-chip intervals—because it does not know when any chip starts. But even when a receiver determines the correct guess, it still cannot distinguish one millisecond instance of the code from another, and this is known as ambiguity. In the case of the P code, if the receiver knows the time to within one second (plus or minus a half-second), then there are 10,230,000 possible starting positions for the code; and only one guess out of 10,230,000 is correct. It will take about 10,000 times longer to search the longer P code by testing the possibilities, however, there will be no ambiguity when the search is completed. But if the receiver first acquires the C/A code timing, it can determine when millisecond periods of the code start, even though they look alike because the same pattern repeats every millisecond. Knowing the C/A code's phase reduces the possibilities for the P-code phases to 10,000. That is, acquiring the C/A code signal helps the P code signal acquisition go 1023 times faster.

The code can also be sent once, generally to precisely mark the beginning of a message. An analogy for this situation is a starter's pistol marking the start of a race. When the code is sent only once, there is only one opportunity to detect the timing (for each message). For example, this is essentially the method used by the GPS cross-links (between satellites). The SINCGARS radio, a battlefield radio commonly used by the U.S. military, repeats a short code for a limited time and inverts the last repetition once before each message transmission. This last repetition corresponds to the code being sent once to mark the beginning of the message that follows the code. However, a burst of noise coinciding with this one-time code transmission will cause the system to fail and the message will be lost.

FIG. 1 shows a transmitter 1 and a receiver 9 used in a spread-spectrum system such as the GPS system. The transmitter includes a PN code generator 2 that is driven by a timing counter 3 and both are run based on a clock oscillator 4. The PN code generated by generator 2 is modulated with a carrier signal via modulator 5 which is driven by carrier oscillator 6. Optionally, data can be superimposed onto the code and carrier by using a modulo 2 adder 7. The transmitter 1 transmits the modulated carrier via antenna 8 to a receiver 9.

Receiver 9 receives the transmitted signal via an antenna 10 that provides the received signal to a demodulator 11. The demodulator 11 is driven by a carrier oscillator 12, and produces two signals out-of-phase by 90°. Those signals are designated as in-phase (I) and quadrature(Q) signals. These two out-of-phase signals are provided to a group of parallel correlators 13. The parallel correlators can include as many, and even more, correlators as the number of phases of the code to be tested. For example, if the code length is 1023 symbols, or chips, the parallel correlators 13 can consist of 1023 correlators, one correlator for each possible phase of the code. Multiple banks of the parallel correlators 13 can be used to correlate different signals, such as in this case where one bank correlates the I-signals and another bank correlates the Q-signals. The parallel correlators 13 are also provided with PN reference codes that correspond to the PN codes generated in the transmitter. PN code generator 14 generates the reference codes. The reference codes can be delayed to correspond to the various phases to be tested. Alternatively, the input signals, here the I and Q signals, can be delayed with various delays and correlated with a single PN code to test the different phases. The PN code generator 14 is driven by a local clock oscillator 15 and timing counters 16 which can effect the different timings for the PN reference codes. The local clock oscillator also drives timing counters 16.

The communications system shown in FIG. 1 shows the acquisition mode portion of the receiver. In the acquisition mode the receiver must resolve many concurrent uncertainties; but once these uncertainties are resolved, the receiver can enter the tracking mode which performs only comparatively minor adjustments to keep the receiver's timing locked onto the timing of the received signal. Table 1 below summarizes the uncertainties involved in acquiring a spread spectrum signal and the conventional strategies employed to resolve the uncertainties.

TABLE 1

| Uncertainty | Strategy |
| --- | --- |
| Unsure of carrier phase | Process both I and Q phases |
| Unsure of carrier frequencies | Try several nearby frequencies (range depends on Doppler/frequency uncertainty) |
| Unsure of carrier phase | Process both I and Q phases |
| Unsure of clock (symbol/chip) timing | Sample at twice the symbol/ship rate (e.g., 2 timing guesses per chip) |

TABLE 1-continued

| Uncertainty | Strategy |
| --- | --- |
| Unsure of code phase | Try correlating at all possible code phases (range depends on time uncertainty or code period) |

When attempting to acquire a spread-spectrum signal the receiver initially does not know the correct carrier phase, so the conventional strategy is to process the signal with the two carrier phases signals, the I and Q signals, because at least one of these phases will be close enough to detect the signal, if the carrier frequency is set accurately enough that the phase does not rotate more than about 90 degrees during any given correlation. Each sample has an I and a Q component, also called I and Q data.

If the frequency uncertainty is too great, typically when the transmitter and/or receiver are moving, then the receiver will try to use a sufficient number of frequencies to cover the range of uncertainty. These different frequencies are often called Doppler bins, when the Doppler effect is the largest contributor to the frequency uncertainty.

The receiver also initially does not know the correct clock (chip) phase, although typically it can set the clock frequency close enough to enable detection. The conventional strategy is to sample the received signal at twice the chip rate. Among the odd samples and even samples, at least one of these sample sequences will be close enough to the ideal timing to detect the signal.

Finally, the receiver initially does not know the timing of the PN code. For a repeated n-chip code, there are n code timing possibilities. If the repeat cycle (i.e., the code length) is shorter than the time uncertainty of the receiver, the code will not, by itself, resolve all of the receiver's time uncertainty. If the code length is greater than the range of the receiver's time uncertainty, then the number of code timing possibilities is equal to the number of chips in the range of the receiver's time uncertainty.

The receiver can find the correct carrier frequency and phase and correct chip and code timing faster to the degree that it has more correlators. The correlations of I and Q data are usually combined and counted as one correlation. When a short code such as the C/A code is repeated, it is common practice to provide enough correlators operating concurrently (i.e., "in parallel") to try all code phases, both odd and even chip samples, and to process both I and Q data. Some parallel correlator designs are based on delaying the reference code to obtain different alignments with the received data. Other designs are based on delaying the received signal samples to obtain different alignments with the reference code. In either case, each correlation spans one code length, and each correlation starts and ends at a different time. Thus, one correlation is produced per sample period. A set of correlations may need to be repeated for each Doppler bin, or frequency guess.

However, when the code length is long, such as with the GPS P code, the number of correlations needed to detect the code phase becomes unreasonably large, and other methods must be used to detect the phase of the long code. For example, in the GPS system a separate signal is broadcast using the shorter C/A code to assist in detecting the longer P code.

Whether the code is repeated or transmitted only once, there are many suitable codes and code generators that are known and can be used. Generally, the code is detected in a receiver by one or more correlators that compare the noisy received signal with a noise-free reference code generated at the receiver. A conventional PN code generator 9 is shown in detail in FIG. 2. The PN code generator of FIG. 2 includes a shift register 20 and a modulo-2 adder 21. In this example, the shift register is six bits long, although it can be longer or shorter as needed. The six flip-flops of shift register 20 are synchronously driven by a clock signal. Modulo-2 adder 21 adds the first and sixth bits of the shift register, and inserts the result into the first position of register 20. In this manner, a maximal-length PN sequence is produced.

The receiver can use the same code generator as the transmitter thereby ensuring that the codes are identical. Each correlator effectively computes the sum of the products of received bits times reference bits. The output of a correlator is greatest when its received signal input and reference code input are time-aligned, or in-phase with one another, and small when not aligned, or out-of-phase with one another. Increased noise makes this correlation product increasingly unreliable.

At the outset, the correct time alignment between the received code and the reference code is unknown, so the receiver must try all possible alignments. For fast detection, a receiver typically will provide one correlator for each possible alignment, to try all alignments simultaneously. The alignments are spaced closely enough that at least one correlator will be sufficiently aligned to detect the code. The set of alignments is achieved either by delaying the reference code by successive small amounts, such as one bit at a time, or by delaying the received signal. Alternatively, a receiver can try the phase alignments sequentially, reducing the number of correlators, and thereby reducing the hardware cost but increasing the search time and thereby increasing the time cost. The simultaneous and sequential correlation methods can be combined, but the hardware cost times the time cost is proportional to the number of possible time alignments.

The outputs of the correlators are compared, and the correlator with the highest output indicates the correct alignment. Since the timing of the reference generator is known, and the delay used with the correlator that provides the strongest output is known, the timing of the signal, although obscured by noise, is then known.

It is established in theory and in practice that if the length of the code is multiplied by n, equal performance, namely reliable detection, can be obtained with n times as much noise power, for the same signal power and other factors. The longer code period also provides more timing information. But this increases, by n-fold, the number of alignments that must be tried, thus also the number of correlations and the size of the correlator sums. This increases some costs n-fold, and other costs even more.

Alternatively, shorter codes can be used and the correlation can be summed over n repetitions of the code. This also increases the size of the correlator sums, and related costs, and the longer correlation can handle n times as much noise power. But summing over repetitions of the shorter code does not provide more timing information, because the number of identifiable code alignments is not changed.

For example, suppose a communications system uses a code one second long that repeats. The receiver finds a maximum correlation, or detects a code alignment, once per second (like a one-second clock tick). A double-length (two second) correlation can handle twice as much noise, but there is still one alignment per second. A two-second correlation on a two-second code will also handle twice the noise, but will have one alignment every two seconds. The receiver acquires more timing information with the two-second code, because it can distinguish odd and even seconds. But the longer code has twice as many possible phase positions, which doubles the cost.

Accordingly, conventional data transmission systems that use long PN codes have used expensive hardware solutions or employ two separate signals with different codes, with the associated hardware costs and complexities, such as in the GPS system discussed above, to acquire and use the more noise tolerant long codes in a timely manner.

SUMMARY OF THE INVENTION

Therefore, in light of the above, and for other reasons that will become apparent when the invention is fully described, an object of the present invention is to provide a relatively long code by interleaving two shorter codes.

A further object of the present invention is to generate a code with good noise tolerance that can be detected quickly with a relatively low hardware cost.

Yet a further object of the present invention is to provide a signal with increased noise tolerance.

A still further object of the present invention is to provide a signal that can be effectively received in the presence of a jamming signal.

Another object of the present invention is to provide a pseudonoise code signal by interleaving two shorter pseudonoise noise signals.

The aforesaid objects are achieved individually and in combination, and it is not intended that the present invention be construed as requiring two or more of the objects to be combined unless expressly required by the claims attached hereto.

In accordance with one aspect of the invention, there is described a code generating apparatus, including a first code generator generating a first code of n symbols; a second code generator generating a second code of m symbols, where m is greater than n; and a combiner for combining the symbols generated by the first and second code generators to generate a combined code for which both the first and second codes can be detected. The combiner can be a multiplexer that interleaves the symbols of the first and second codes to generate an interleaved code. Also, n and m preferably are mutually prime, and can be such that m=n+1, and the first and second codes can be pseudonoise (PN) codes.

In accordance with another aspect of the invention, there is described a method of generating a combined code including, combining a plurality of codes each having a length shorter than the transmission code, and outputting the combined code. The plurality of codes can be detected from the combined code, and the phase of the combined code can be detected from the plurality of codes.

In accordance with yet another aspect of the invention, there is described a method of generating a code, including generating a symbol of a first code of length n symbols; generating a symbol of a second code of length m symbols, where m is greater than n; and generating a third code by outputting the symbol of the first code followed by the symbol of the second code. The first and second codes can be PN codes, and m and n preferably are mutually prime and can be such that m=n+1.

In accordance with still another aspect of the invention, there is described a transmitter, including a controller outputting first, second and third control signals based on a count; a first code generator generating a first code of n symbols in response to the first control signal; a second code generator generating a second code of m symbols in response to the second control signal; and a combiner coupled to the controller and the first and second code generators, wherein the combiner in response to the third control signal combines the symbols of the first code with the symbols of the second code and outputs a combined code. The combiner can be a multiplexer that interleaves symbols of the first code with symbols of the second code, thereby outputting the combined code as an interleaved code. Also, the first and second codes can be PN codes, and m and n preferably are mutually prime and can be such that m=n+1.

In accordance with still yet another aspect of the invention, there is described a transmission signal having a sequence of symbols, the sequence including symbols of a first code of n symbols interleaved with symbols of a second code of m symbols. The first and second codes can be PN codes, and m and n preferably are mutually prime and can be such that m=n+1. Also, the first code can repeat modulo n and the second code can repeat modulo m, and the sequence can repeat modulo $2 \cdot n \cdot m$.

The above and still further objects, features and advantages of the present invention will become apparent upon consideration of the following descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

BRIEF DESCRIPTION OF THE DRAWINGS

FIG. 2 is a block diagram of a conventional pseudonoise (PN) generator.

FIG. 3A shows an example of two short codes to be interleaved together to form an interleaved code.

FIG. 3B shows the interleaved code formed from the two short codes shown in FIG. 3A.

FIG. 4A shows the values of the interleaved codes shown in FIG. 3A.

FIG. 4B shows the sequence of values of the interleaved code formed from the values of the two short codes shown in FIG. 4A.

FIG. 8 is a block diagram of portion of a transmitter that generates a truncated interleaved code.

DESCRIPTION OF THE PREFERRED EMBODIMENTS

Figure 1:
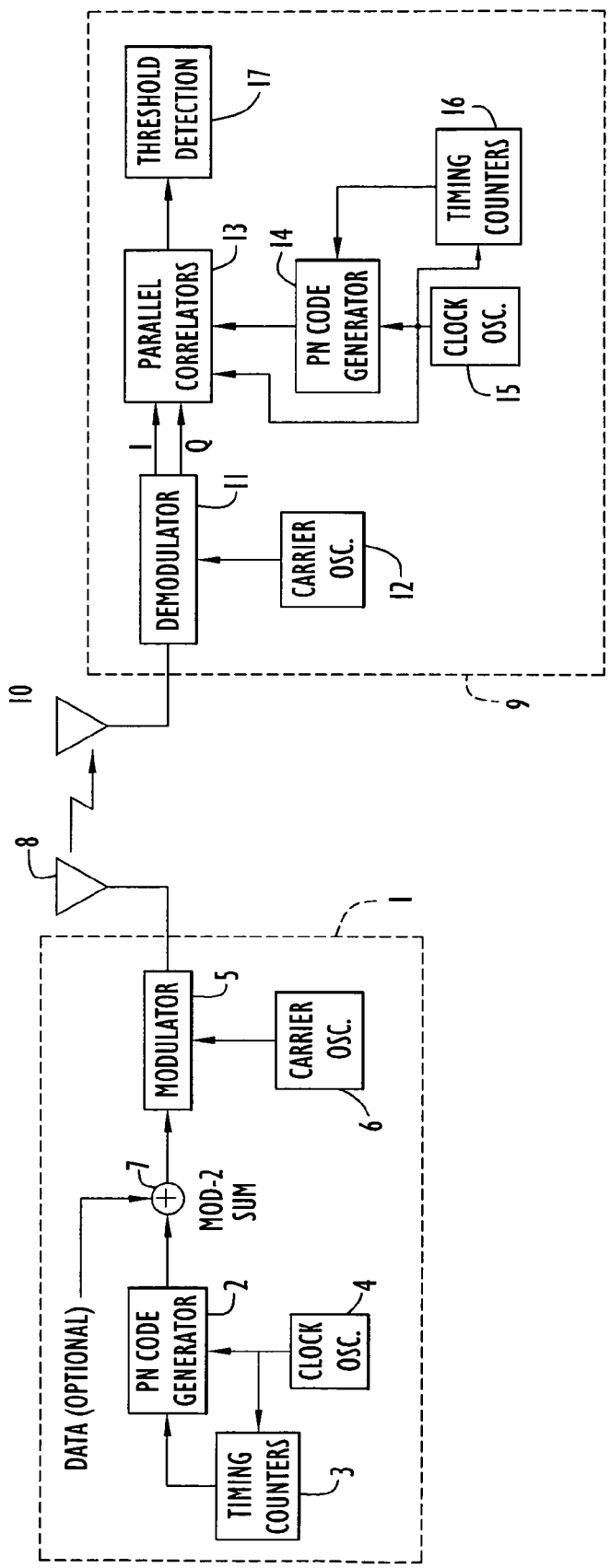
FIG. 1 is a block diagram of a conventional spread spectrum communication system.

The following detailed explanations of the preferred embodiments describe the best known ways of practicing the present invention.

The invention herein described combines two or more short codes to achieve the performance of a much longer code. For example, two codes of about one thousand bits each transmitted in about one millisecond can be combined to make a composite code of about two million bits transmitted in about two seconds. This provides one code alignment every two seconds, and increases the noise tolerance two-thousand-fold over the short code, which may be necessary if a jamming signal is present on the communication links. Although the descriptions and examples provided here will favor the case where the code is repeated, the invention also can be applied to the situation where the code is transmitted only once.

Summing correlations of a received signal with a 1000-bit reference code over two thousand repetitions of the 1000-bit PN code will provide the same noise tolerance as with the two million bit code, but only provides one code alignment per millisecond. Simply increasing the code length two-thousand-fold also provides the same noise tolerance, and provides one code alignment every two seconds, but would increase the cost enormously, because there are two million possible time alignments. However, using the present invention, there are two thousand possible time alignments for each code (four thousand altogether), so the combined hardware cost and time cost is reduced five-hundred-fold.

Sometimes two signals are used as in the GPS system. The receiver detects a short code (the first signal), then uses the partial timing information thus acquired to detect a very long code (the second signal). The processing of two signals basically doubles the cost because of more parts for the receiver, and because it involves a two-step process that presents more opportunities to fail. The present invention uses one signal, and thus effects only the cost of the code detection part of the receiver.

Described next is a method of constructing a long pseudonoise code from two shorter pseudonoise codes, useful for conveying time or pseudorange information over a noisy communication channel. In such applications, the pseudonoise code symbols are comprised of 'chips', and they are alternatively referred to here as "bits". Although a "chip" can be a binary digit, i.e., a "bit", the invention is not limited to use only with binary symbols.

In a simple case of an interleaved code according to the present invention, any relatively short code, preferably with good autocorrelation properties, is combined with another short code. That other short code can be generated by adding or deleting one bit, such as at the end of the first code. This results in deriving two short codes, one n bits long and the other n+1 bits long. These two codes are then combined, such as by interleaving them, and the resulting pattern repeats after every $2 \cdot n \cdot (n+1)$ bits. This is because n and n+1 are always mutually prime. That is, the short codes do not have a common factor. Thus, a longer code of $2 \cdot n \cdot (n+1)$ bits is generated by interleaving the two shorter codes. The invention is not limited to using codes that are mutually prime. However, if mutually prime length codes are used an interleaved code of maximal length will result.

More generally, two relatively short codes of lengths m and n can be interleaved, where m and n are mutually prime, thus generating a longer code of $2 \cdot m \cdot n$ bits. More than two codes, preferably of mutually prime lengths, can be interleaved according to the invention, however using only two codes will generally minimize the cost and will suffice for many applications. Although the minimum number of short codes to be combined according to the invention is two, and hence is the simplest choice, more generally more than two codes can be combined according to the invention. For example, three or more short codes can be interleaved, or more generally, combined. Three short codes having mutually prime lengths of m, n, and p would yield a long code of length 3*m*n*p.

In general, the present invention independently detects the phase of each short code and allows the well-known Chinese Remainder Theorem to be used to derive the phase of the long code. In the simplest case, a short code A (n bits long) with bits numbered from 0 to n−1, and a short code B (n+1 bits long) with bits numbered from 0 to n are interleaved bit by bit or symbol by symbol to form a longer code. If the long code begins with bits A0 and B0 in the first pair of bits (pair 0), and if a receiver detects bit a of code A and bit b of code B in the same bit pair, then the receiver calculates that the position of that bit pair in the long code is equal to (n+1)·a−n·b, adding n·(n+1) if this is negative.

The cost of detecting short code A is proportional to the number of possible phases, 2·n. The factor of two is included because the receiver initially does not know which bits are of code A, and which are of code B. Likewise, the cost of detecting short code B is proportional to 2·(n+1), so the total cost of detecting short codes A and B interleaved with one another is proportional to 4·n+2. This is much less than the cost of detecting the long code as a whole, which is proportional to 2·n·(n+1). For example, if n=1000, 4·n+2=4002 and 2·n·(n+1)=2,002,000. Thus, the cost of detecting the interleaved short codes, in this example, is about 500 times less expensive than detecting the longer non-interleaved code.

A Small Code Example

FIGS. 3A and 3B illustrate how an interleaved code can be constructed with 5-bit and 6-bit codes according to the invention. These figures do not show the actual value of the bits but instead show the bit positions within the short codes. Here, the bits of the 5-bit code (A) are named 0 1 2 3 4, and the bits of the 6-bit code (B) are named 0 1 2 3 4 5. FIG. 3A shows these numerical names, with the bits of code A raised slightly to make the construction easier to see. FIG. 3B shows the bits of codes A and B interleaved and in sequence.

For the first repetition of the component codes, bit n of code B precedes bit n of code A. For the next repetition, bit n of code B follows bit n of code A. Code B, which is longer, and which therefore repeats more slowly, progressively lags behind code A until the two component codes are again nearly aligned. The composite interleaved code repeats every 2·5·6=60 bits, wherein the 5-bit code is repeated 6 times and the 6-bit code is repeated 5 times, for 30 bits each.

FIG. 4A illustrates the same interleaving again, but shows the bit values. Here, the bit sequence is 00101 for the 5-bit code A, and the last bit is repeated in code B to obtain the 6-bit code 001011. FIG. 4B shows the bit values of the interleaved codes in sequence, and shows how the bits are doubled in the intervals where the two component codes are nearly aligned.

Near the middle of the sequence shown in FIG. 4A is the bit-pair b=5, a=2. Applying the formula 6·a−5·b, results in −13, and since this is negative, 5·6 is added to obtain 17, the position of the bit-pair, where the first position is 0.

A Larger Code Example

In a practical application, the codes are likely to be much longer that the small example described above. For example, a 1023-bit maximum-length code (m-sequence) might be chosen as code A; and code B could be 1024 bits long, identical to code A, but with one additional bit at the end. This produces a composite code that is 2·1023·1024= 2,095, 104 bits long. In an actual application, the bit rate might be 10.23 million bits per second, so that the code length is 0.2048 seconds. The entire code need not be used, and it may be convenient to use a length of exactly 0.2 seconds to more easily relate to ordinary clock time. Accordingly, the code may be truncated to exactly 2,046,000 bits, which at 10.23 MHz corresponds to a code period of 0.2 seconds. This provides an opportunity to avoid using the 2047 bits where the two component codes are nearly aligned. The arithmetic is easily adjusted to account for the number of truncated bits.

Transmitter

The interleaved code of the invention typically would be used in a digital data transmission system having a transmitter and a receiver. The transmitter would generate the interleaved code and send it, generally with other data superimposed on it, to a receiver. The receiver would also generate the same interleaved code as a reference code in order to synchronize with the transmitter, and could then extract the data superimposed on the transmittal signal.

Figure 5:
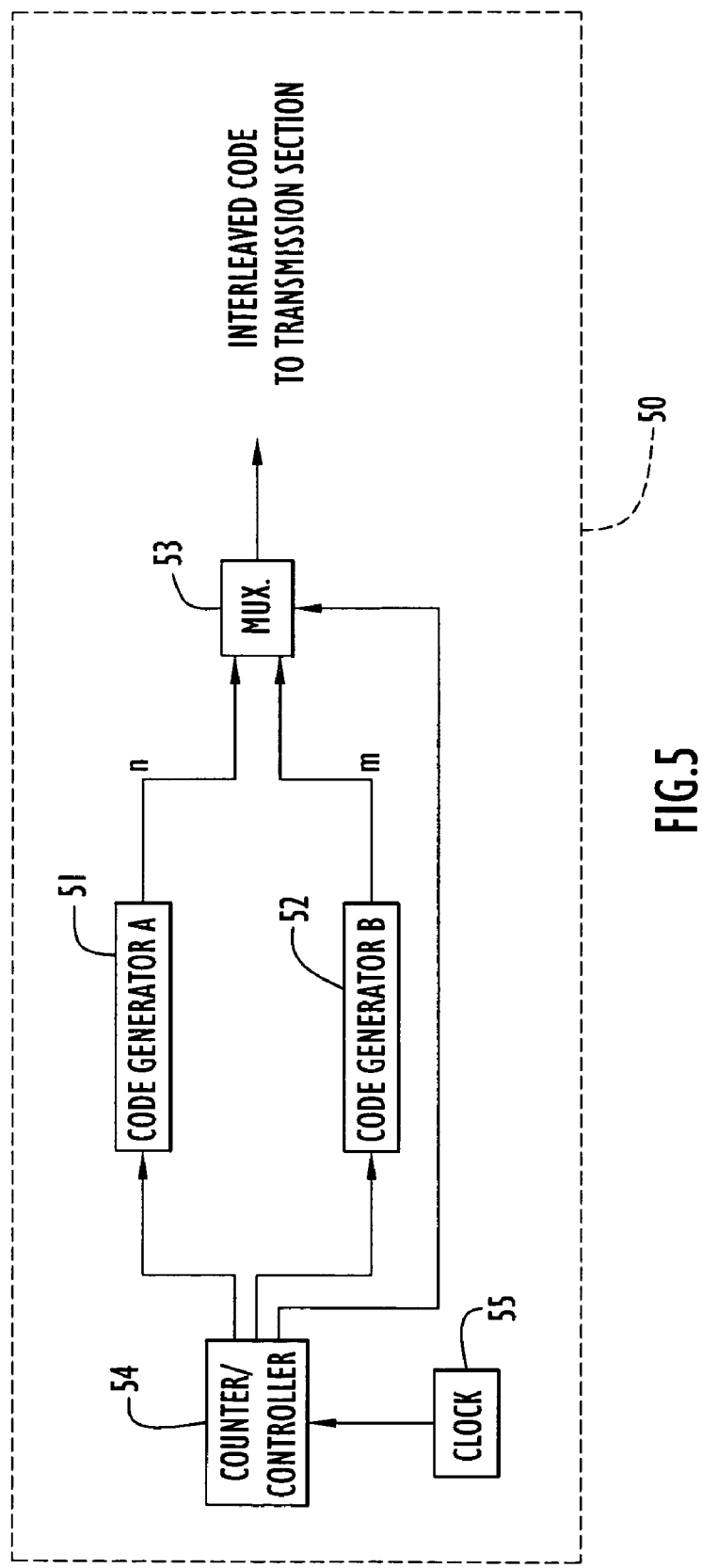
FIG. 5 is a block diagram of a portion of a transmitter that generates the interleaved code.

FIG. 5 shows an example of a transmitter 50 that generates an interleaved code, and includes two code generators, code generator A (51) and code generator B (52). Each code generator can be a pseudonoise (PN) generator, with a structure similar to the PN generator shown in FIG. 2. The two code generators are not identical, because they must output codes of different length. Here, PN code generator A (51) outputs a PN code of length n, and PN code generator B (52) outputs a PN code of length m. Preferably, n and m are mutually prime, such as when m=n+1.

The two outputs of the PN generators 51 and 52 are interleaved with one another. Here, a multiplexer 53 acts as a combiner to interleave the symbols, or chips, of the outputs of the two code generators. Other devices that serve to combine those bits can be used. Multiplexer 53 outputs the interleaved codes to a transmission section of the transmitter (not shown) for transmission to a receiver(s). The code generators 51 and 52 are controlled by a counter/controller 54 that is driven by a clock 55, so that when the code generators 51 and 52 reach the end of their codes, they are reset and begin again. The counter/controller 54 also sends control signals to multiplexer 53 to inform it when to output a symbol, or chip, from code generator A and when to output a symbol, or chip, from code generator B.

Figure 6:
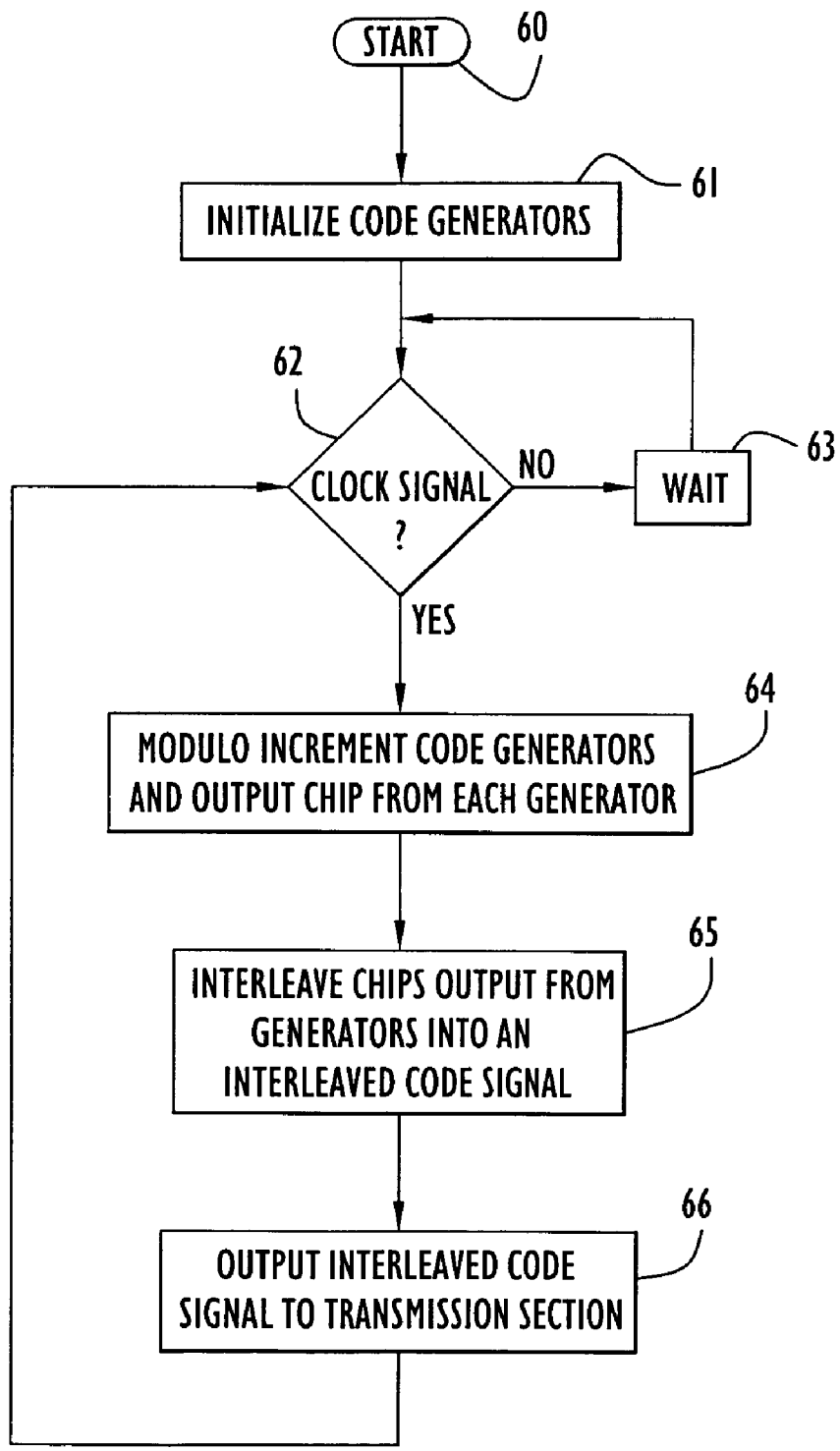
FIG. 6 is a flowchart illustrating a method for generating the interleaved code.

The interleaved code can be generated according to the following process, shown in the flowchart of FIG. 6. The process is started, as shown in FIG. 6, at operation 60, and the code generators A and B are initialized in operation 61. The clock 55 outputs a clock signal to drive counter/ controller 54. The transmitter is clock driven so that if no clock signal is present the components wait, as indicated in operations 62 and 63. If a clock signal is present, as indicated in operation 62, the counter/controller 54, in operation 64, sends a signal to each of the code generators to generate the next chips in the respective code sequences. In response to the signal from counter/controller 54 each code generator modulo increments according to its code length. For example, if the length of the code generated by code generator A (51) is n, code generator A increments modulo n. Similarly, if the length of the code generated by code generator B (52) is m, code generator B increments modulo m. Each code generator outputs the generated chip to multiplexer 53, which, in operation 65, interleaves the chips into a single interleaved code that is output to a transmission section of the transmitter in operation 66.

For example, if code generator A outputs the sequence "1001" and code generator B outputs the sequence "10011" in successive clock cycles, the multiplexer interleaves those chips and outputs the sequence "110000111" to the transmission section. The multiplexer can interleave the codes by delaying one of the codes by one chip. This delay can occur in either the multiplexer or at the code generator. Operations 62 through 66 repeat to generate and output the interleaved code.

As discussed above, there are instances where it may be advantageous for the interleaved code to have a period shorter than the entire period of the combined short codes. For example, it may be convenient for the interleaved code length to have a length corresponding to exactly 0.2 seconds to more easily relate to ordinary clock time. Accordingly, the code may be adjusted to output exactly 2,046,000 bits at a rate of 10.23 MHz. Here, in operation 61 of FIG. 6 one of the code generators could be initialized to a non-zero value so the interleaved code would begin at a later phase in the code than if it were initialized to zero. When the code generator reaches the end of its code the transmitter could reinitialize it to the predetermined initialization value, instead of to zero. This method would essentially remove bits from the front of the code. Similarly, bits can be truncated from the end of the interleaved code.

Figure 7A:
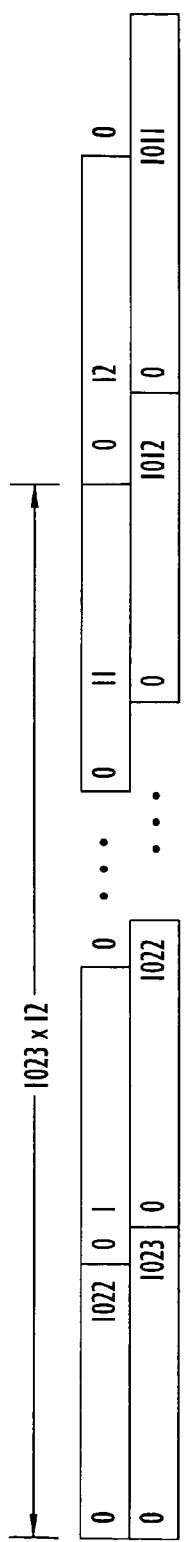
FIG. 7A shows the first part of two interleaved codes to be truncated.
Figure 7B:
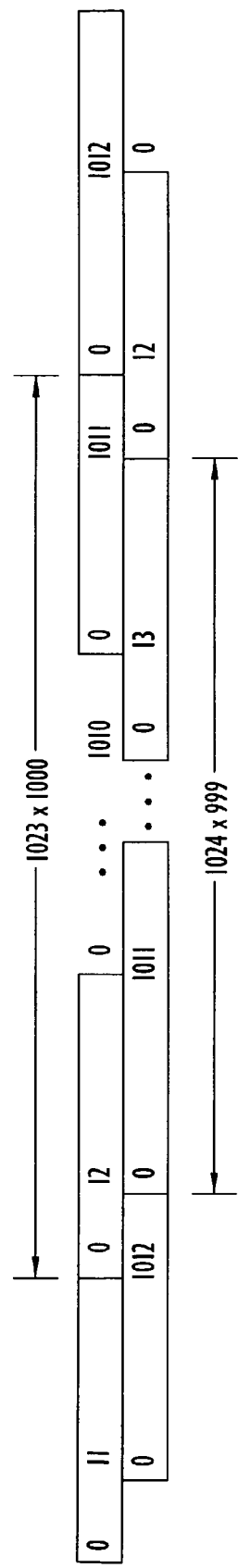
FIG. 7B shows the middle part of the two interleaved codes of FIG. 7A, that is used as the code to be transmitted and detected.
Figure 7C:
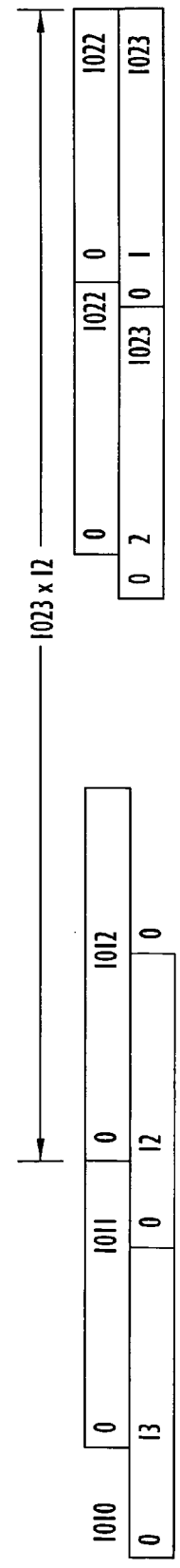
FIG. 7C shows the last part of the two interleaved codes of FIG. 7A, that is to be truncated.

FIGS. 7A–7C show how portions of the two short codes can be selected to achieve a truncated code with a convenient code length. Here, FIG. 7A shows a beginning portion of a combined 1023 and 1024 code. In this instance the first twelve repetitions of the 1023 length code are truncated. Accordingly, the part of the code labeled as 1023×12 is not transmitted by the transmitter. FIG. 7B shows the middle portion of the interleaved short codes and the following twelve bits of the 1024 code selected for transmission in this example. Here, one thousand repetitions of the 1023 code along with nine hundred ninety-nine repetitions of the 1024 length code are selected for transmission by the transmitter. Additionally, twelve bits or chips of the 1024 code that are interleaved with the first twelve bits of the 1023 code that are transmitted are included, as are twelve bits of the 1024 code interleaved with the last twelve bits of the 1023 code that are transmitted. FIG. 7C shows the end portion of the interleaved code that is truncated in this example. Here, the last twelve repetitions of the 1023 code are not transmitted. Accordingly, the total number of bits transmitted in the truncated code is (1023×1000)+(1024×999)+24 bits=2,046,000 bits, which at a rate of 10.23 MHz has a code period of exactly 0.2 seconds.

In another aspect of the invention depicted in FIG. 8, the counter/controller 80 is modified to include a control signal for controlling a multiplexer 81 to truncate the interleaved code as shown in FIGS. 7A–7C. The counter controller 80 controls the multiplexer 81 to interleave codes A and B so that only the symbols or chips of codes A and B corresponding to the selected symbols shown in FIG. 7B are interleaved and transmitted.

Other techniques for truncating or selecting only a portion of the combined short codes can be used to achieve a convenient long code length. For example, only bits at either the beginning or the end of the combined sequence can be truncated to form a convenient long code length.

The counter controller 80, the code generators A (51) and B (52), and multiplexer 81 can be implemented in hardware, software or firmware using well-known techniques.

Although the invention has been described in terms of two binary codes of length n and n+1, other variations fall within its scope. For example, more than two codes can be interleaved to achieve the benefits of the invention. Also, two codes that are mutually prime, other than of lengths n and n+1 can be used. Further, codes that are not mutually prime can be used, although the increased noise tolerance achieved with longer codes may not be realized to the maximum extent because the code would have a shorter than maximum period due to a common factor between the code lengths. While it is expected that binary codes will be used most often, the invention can be applied in systems with more than two transmission symbols.

Having described preferred embodiments of an interleaved code structure, techniques and devices for generating those code structures, and techniques and devices for transmitting those codes, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of generating a combined code comprising:
   a) combining a plurality of codes each having a length shorter than the combined code, the plurality of codes including at least three codes having lengths m, n, and p, where m, n, and p, are mutually prime, wherein the combined code has a length of 3·n·m·p; and
   b) outputting the combined code, wherein the plurality of codes can be detected from the combined code, and the phases of the combined code can be detected from the plurality codes.

2. A method of generating a code, comprising:
   a) generating a symbol of a first code of length n symbols;
   b) generating a symbol of a second code of length m symbols, where m is greater than n;
   c) generating a third code by outputting the symbol of the first code followed by the symbol of the second code; and
   d) repeating a) through c) at least 2·n·m times.

3. The method of generating a code according to claim 2, wherein in a) the symbols of the first code are generated in order, modulo n, and in b) the symbols of the second code are generated in order, modulo m.

4. A method of generating a code, comprising:
   a) generating a symbol of a first code of length n symbols;
   b) generating a symbol of a second code of length m symbols, where m is greater than n;
   c) generating a third code by outputting the symbol of the first code followed by the symbol of the second code;
   d) repeating a) through c) a predetermined number of times less than n·m times; and
   e) outputting an output signal having a predetermined number of symbols less than 2·n·m symbols.

5. The method of generating a code according to claim 4, wherein each symbol is comprised of chips representing a binary value.

6. A transmitter, comprising:
   a controller outputting first, second and third control signals based on a count;
   a first code generator generating a first code of n symbols in response to the first control signal;
   a second code generator generating a second code of m symbols in response to the second control signal, where m is greater than n; and a multiplexer coupled to the controller and the first and second code generators, for interleaving symbols of the first code with the symbols of the second code, wherein the controller outputs a signal to the multiplexer to output only selected portions of one or more of the first and second codes, so that the interleaved code has a length less than 2·n·m symbols.

7. A transmission signal having a sequence of symbols, the sequence comprising symbols of a first code of n symbols interleaved with symbols of a second code of m symbols, wherein the first code repeats modulo n and the second code repeats modulo m, and the sequence repeats modulo 2·n·m.

8. The transmission signal of claim 7, wherein each symbol is comprised of chips that each represents a binary value.

9. A code generating apparatus for generating an output code of a predetermined length, comprising:
- a first code generator configured to generate a first code of n symbols;
- a second code generator configured to generate a second code of m symbols, wherein values of m and n permit generation of a code that repeats modulo 2·n·m symbols by interleaving symbols of the first and second codes, and 2·n·m symbols exceeds the predetermined length; and
- a combiner configured to interleave symbols of the first and second codes to generated the output code having a number of symbols corresponding to the predetermined length, wherein the number of symbols is less than 2·n·m.

10. The apparatus of claim 9, wherein the combiner truncates symbols relative to a code of 2·n·m symbols to generate the output code.

11. The apparatus of claim 9, wherein the combiner omits symbols of a code of 2·n·m symbols to generate the output code.

12. A method of generating an output code of a predetermined length, comprising:
- generating a first code of n symbols;
- generating a second code of m symbols, wherein values of m and n permit generation of a code that repeats modulo 2·n·m symbols by interleaving symbols of the first and second codes, and 2·n·m symbols exceeds the predetermined length; and
- interleaving symbols of the first and second codes to generated the output code having a number of symbols corresponding to the predetermined length, wherein the number of symbols is less than 2·n·m.

13. The method of claim 12, wherein symbols are truncated from a code of 2·n·m symbols to generate the output code.

14. The apparatus method of claim 12, wherein symbols are omitted from a code of 2·n·m symbols to generate the output code.

* * * * *